United States Patent [19]

Matlack

[11] Patent Number: 4,918,146

[45] Date of Patent: Apr. 17, 1990

[54] SURFACE MODIFICATION OF POLYCYCLIC CYCLOOLEFIN POLYMERS

[75] Inventor: Albert S. Matlack, Hockessin, Del.

[73] Assignee: Hercules Incorporated, Wilmington, Del.

[21] Appl. No.: 341,007

[22] Filed: Apr. 20, 1989

[51] Int. Cl.$^4$ ................................................ C08F 8/22
[52] U.S. Cl. .................................. 525/354; 525/337.1; 525/351; 525/355; 525/356; 525/358; 525/359.1; 427/248.1; 428/521
[58] Field of Search ............... 525/351, 354, 355, 356, 525/358, 359.1; 427/248.1

[56] References Cited

U.S. PATENT DOCUMENTS

| | | | |
|---|---|---|---|
| 2,631,984 | 3/1953 | Crawford et al. | 525/332.1 |
| 3,220,993 | 11/1965 | Blatz | 525/332.1 |
| 3,240,762 | 3/1966 | Wilks et al. | 525/339 |
| 3,758,450 | 9/1973 | Magrave et al. | 525/356 |
| 4,228,254 | 10/1980 | Powers et al. | 525/332.1 |
| 4,245,060 | 1/1981 | Powers et al. | 525/332.1 |
| 4,400,340 | 8/1983 | Klosiewicz | 525/211 |
| 4,436,858 | 3/1984 | Klosiewicz | 524/297 |
| 4,507,453 | 3/1985 | Tom | 526/283 |

Primary Examiner—Joseph L. Schofer
Assistant Examiner—Bernard Lipman
Attorney, Agent, or Firm—Mark Goldberg

[57] ABSTRACT

It has been found that the properties of polycyclic cycloolefins, in particular poly(dicyclopentadiene), can be substantially improved by halogenation of the surface. Both aqueous and gaseous treatments of the polymer have been found to significantly improve the resistance to various acids and solvents. Chlorine, fluorine and bromine, in particular, when incorporated into the surface of the polymer increase chemical resistance, improve retention of properties upon aging, reduce emission of residual monomer, and encourage better adhesion of paint.

Among the substances found to provide the desired chemical resistance on the polymer surface were dry chlorine gas, aqueous chlorine, immersion in liquid bromine, aqueous bromine, and fluorine gas. Similar improvement in chemical resistance can be obtained through treatment with pseudohalogen compounds or interhalogen compounds.

5 Claims, No Drawings

SURFACE MODIFICATION OF POLYCYCLIC CYCLOOLEFIN POLYMERS

This invention relates to methods of treating the surfaces of molded articles made from polycyclic cycloolefin polymers. This invention especially relates to the halogenation of the surfaces of molded articles to produce resistance to various acids and solvents.

BACKGROUND OF THE INVENTION

Preparation of thermoset cycloolefin polymers via metathesis catalysts is a relatively recent development in the polymer art. Klosiewicz, in U.S. Pat. Nos. 4,400,340, 4,568,660, 4,469,809 and 4,436,858, and Tom in U.S. Pat. No. 4,507,453, teach preparation of such polymers from dicyclopentadiene (DCPD) and other similar cycloolefins via a two-stream reaction injection molding technique wherein a first stream, including the catalyst, and a second stream, including a catalyst activator, are combined in a mix head and immediately injected into a mold where, within a matter of seconds, polymerization and molding to a permanently fixed shape take place simultaneously. Such polymers can also be molded from a single stream with use of an additive to delay gelation. These polymers are characterized by high impact strength and high modulus. Characteristics of these and other thermoset polymers include insolubility in common solvents such as gasoline, naphtha, chlorinated hydrocarbons, and aromatics as well as resistance to flow at elevated temperatures. Although thermoset polymers are characterized by their insolubility, they are still subject to appreciable swelling in solvents as well as to degradation by acids. Also, despite thermoset polymers being insoluble in hydrocarbon solvents due to extensive crosslinking, if untreated, when immersed in such solvents for a prolonged period of time, they will sufficiently absorb such hydrocarbons to degrade the polymer's properties. Another feature of these polymers is that when polymerization of the DCPD monomer has been completed, there is often a small percentage of monomer remaining in the article which is slowly emitted over a period of time. It would be desirable to prevent the emission of monomer.

Surface treatments have been used on other polymers to obtain desired properties. Fluorination is used to seal polyethylene gasoline tanks and bottles that contain motor oil. This process uses fluorine diluted with an inert gas at an elevated temperature with a contact time of a few seconds. The basic process is disclosed in U.S. Pat. No. 3,758,450. A less effective process for making plastic fuel tanks involves sulfonation with sulfur trioxide followed by neutralization with ammonia. The presence of traces of moisture requires further sealing with an amino resin.

It is an objective of this invention to treat the surfaces of poly(DCPD) articles to increase their resistance to degradation by chemicals such as acids, hydrocarbons, and other materials. It is also an object of this invention to treat the surfaces of these articles to significantly reduce the escape of residual monomer remaining in the article after polymerization. A further object of this invention is to improve the adherence of paints to the surfaces of poly(DCPD) articles.

SUMMARY OF THE INVENTION

It has been found that the properties of polycyclic cycloolefin articles such as those containing poly(dicyclopentadiene) can be substantially improved by halogenation of the article's surface. Both aqueous and gaseous treatments of the polymer have been found to significantly improve the resistance to various acids and solvents. Chlorine, fluorine and bromine, in particular, when incorporated into the surface of the polymer increase chemical resistance, improve retention of properties upon aging, reduce emission of residual monomer, and encourage better adhesion of paint.

Among the substances found to provide the desired chemical resistance on the polymer surface were dry chlorine gas, aqueous chlorine, immersion in liquid bromine, aqueous bromine, and fluorine gas. Treatment with iodine changed the polymer from an insulator to a semiconductor. These halogens probably attach at the polymer's double bonds. Similar enhancement of surface properties can be obtained through treatments with compounds that react in a manner similar to halogens, e.g., pseudohalogens and interhalogen compounds.

DETAILED DESCRIPTION OF THE INVENTION

The surface treatments of this invention are applied to polymeric molded articles made from strained ring cycloolefins that are metathesis polymerizable. Typical of such polymers is poly(dicyclopentadiene), a thermoset polymer produced by metathesis polymerization. Although the polymer employed in the examples herein is poly(DCPD), other strained ring cycloolefins such as higher cyclopentadiene oligomers, norbornene, norbornadiene, 4-alkylidene norbornenes, dimethanooctahydronaphthalene, dimethanohexahydronaphthalene and substituted derivatives of these compounds may be used. The preferred cyclic olefin monomer is dicyclopentadiene or a mixture of dicyclopentadiene with other strained ring hydrocarbons in ratios of 1 to 99 mole % of either monomer, preferably about 75 to 99 mole % dicyclopentadiene. Without the surface treatments of this invention, the polymer is susceptible to attack by acids, hydrocarbon solvents and other chemical substances. The untreated polymer exhibits blistering and swelling, with greater degradation occurring with longer exposure.

Some protection of the polymer against such chemical substances and reduction of the emission of residual monomer is obtained by treatment with acids including sulfuric acid, peracetic acid and nitric acid. Other acids that can be used include other peracids, $HClO_4$ and $HClO_3$. Sulfuric acid causes hydration of plain double bonds in the polymer and significant reduction in the rate of emission of residual monomer. However, impact strength of the polymer was reduced as compared to an untreated control. The polymer is attacked readily by 70% nitric acid. Stopping the reaction before it has gone very far is an inexpensive route to creating a polar surface. Nitric acid treatment was found to improve the resistance to toluene and subsequent reaction with potassium tert-butoxide provided further improvement. Selection of the appropriate acid to treat the polymer for the appropriate period of time provides improved resistance to chemical substances, reduction in emission of residual monomer, and improved adhesion of paint coatings. However, the surface treatments claimed in this invention were found to provide significantly better results than the acid treatments.

In this invention, halogens or compounds that react in a similar manner as halogens are added to the double bonds of the polymer through various methods, including immersion in an aqueous solution of the halogen and exposure of the surface of the polymer to a gaseous or liquid halogen treatment. The halogens that are used in accordance with this invention include bromine, fluorine and chlorine. Compounds that react similarly to halogens, in addition to double or triple bonds or substitution of aromatic rings, include pseudohalogen compounds and interhalogen compounds. Among the pseudo-halogen compounds that can be employed in the practice of this invention include ClSCN, ISCN, INCO, $(SCN)_2$, $IN_3$, $INO_3$, and $BrN_3$. The interhalogen compounds that can be employed in the practice of this invention include ICl, IF, and BrF. Other compounds that react similarly to the above listed compounds may also be employed for the purposes of this invention.

The metathesis catalyst system comprises two parts, i.e., a catalyst component and an activator. The catalyst component is preferably either a molybdenum or a tungsten halide or such a halide having two valences satisfied by oxygen rather than halogen. The most preferred catalyst component is a tungsten halide, and preferably a mixture or complex of tungsten hexachloride ($WCl_6$) and tungsten oxytetrachloride ($WOCl_4$) in a molar ratio of $WOCl_4$ to $WCl_6$ of about 1:9 to 2:1. This mixture or complex is prepared by contacting essentially pure $WCl_6$ with a controlled portion of an oxygen donor. Useful oxygen donors include, e.g., a hydrated salt, water, a wet molecular sieve and alkyl alcohols. The most preferred oxygen donor is t-butanol. Complete details of the catalyst preparation can be found in Klosiewicz, U.S. Pat. No. 4,568,660.

The tungsten or molybdenum compound is not normally soluble in the monomer, but can be solubilized by complexing it with a phenolic compound. The compound is first suspended in a small amount of an inert diluent such as benzene, toluene, xylene or chlorinated benzene to form a 0.1 to 1 mole per liter slurry. The phenolic compound is added to the slurry in a molar ratio of about 1:1 to 1:3 catalyst compound to phenolic compound and a stream of dry inert gas is passed through the agitated solution to remove hydrogen chloride gas. Preferred phenolic compounds include phenol, alkyl phenols, halogenated phenols or phenolic salts such as lithium or sodium phenoxide. The most preferred phenolic compounds are t-butyl phenol, t-octyl phenol and nonyl phenol.

To prevent premature polymerization of the catalyst component/monomer solution, which would occur within a matter of hours, about 1 to 5 moles of a Lewis base or a chelating agent are added per mole of catalyst compound. Preferred chelants include acetylacetones, dibenzoyl methane and alkyl acetoacetates, where the alkyl group contains from 1 to 10 carbon atoms. Preferred Lewis bases are nitriles and ethers such as benzonitrile and tetrahydrofuran. The improvement in stability and shelf-life of the catalyst component/monomer solution is obtained whether the complexing agent is added before or after the phenolic compound. When this complexed catalyst component is added to purified cycloolefin, for example, dicyclopentadiene, it forms a solution which is stable and has a shelf-life of several months in the absence of an activator.

The second part of the metathesis catalyst system is the activator, which is an alkyl aluminum, alkyl zinc or an alkyl tin compound. The alkyl aluminum compounds, either trialkyl aluminum or dialkyl aluminum halide, are preferred. Particularly preferred is a dialkyl aluminum halide with an alkyl moiety containing 1 to 12 carbon atoms and iodide as the halide. The activator is readily soluble in the cycloolefin. The activator is prepared by mixing the alkyl aluminum compound or mixture of alkyl aluminum compounds with a Lewis base or chelating agent at a 1:1 to 1:5 molar ratio. While either order of addition, i.e., Lewis base to alkyl aluminum compound or alkyl aluminum compound to Lewis base, can be used, it is preferred to add the Lewis base to the alkyl aluminum with agitation. The reaction is highly exothermic, and it is desirable to control the rate of Lewis base addition to the alkyl aluminum compound so as to maintain the temperature at less than approximately 50° C. to prevent decomposition of the rate moderator complex. In the case of solid.Lewis bases, the base can be added as the solid or dissolved in a suitable nonreactive solvent such as toluene. The activator can also be prepared by dissolving or suspending the Lewis base in the cycloolefin and adding the alkyl aluminum component. In all examples herein the activator had bis(2-methoxyethyl) ether, also known as diglyme, added. Other Lewis acids and chelating agents will also work.

When the two parts of the catalyst system are combined, the resulting cycloolefin (for example DCPD) to catalyst compound ratio will be from about 500:1 to about 15,000:1 on a molar basis, preferably 2000:1 and the catalyst compound to alkyl aluminum ratio will be from about 1:2 to about 1:5. Two different DCPD polymers or copolymers (labeled Polymer 1 and Polymer 2) were subjected to the surface treatments. Polymer 1 contained a small amount of tricyclopentadiene and Polymer 2 contained about 11 weight % tricyclopentadiene. Each of the polymers were made with a molar ratio of 1000:0.56:1.68 of monomer:tungsten catalyst:aluminum activator (85:15 trioctylaluminum:dioctylaluminum iodide). One equivalent dichlorodiphenylmethane was added to the catalyst for each equivalent of the tungsten catalyst. One equivalent diglyme was added for each equivalent of aluminum activator. Table 1 details the composition of these polymers. The remainder of each composition to a 100 weight % total is made up of DCPD. Irganox 1035, a stabilizer, is thiodiethylene bis(3,5-di-tert-butyl-4-hydroxy) hydrocinnamate manufactured by Ciba-Geigy.

TABLE 1

| Polymer 1 | |
|---|---|
| Weight % | Ingredient |
| 3.0 | Tricyclopentadiene |
| 4.5 | EPDM rubber (Ethylene-propylene termonomer) |
| 0.7 | Diphenylamine |
| 1.3 | Irganox 1035 |
| 0.2 | Carbon black |

| Polymer 2 | |
|---|---|
| Weight % | Ingredient |
| 11.0 | Tricyclopentadiene |
| 5.0 | EPDM rubber |
| 0.7 | Diphenylamine |
| 1.3 | Irganox 1035 |

The effect of the surface modification was tested in several ways. Most reactions were run on polymer samples 4×4 mm squares cut from ⅛ inch thick sheets. Those samples which were to be tested for the rate of loss of residual DCPD by gas chromatography were 0.85×3.75 cm strips. After each treatment was completed, the samples were cooled, rinsed well with water, dried and weighed. The infrared spectra were taken of the molded surfaces. These samples fitted the holder for measurement of the infrared spectrum in the range from 4000 to 600 cm$^{-1}$ by the photoacoustic method. The depth of penetration included the top 17 microns of the polymer at 1735 cm$^{-1}$, the top 18 microns at 1450 cm$^{-1}$ and the top 24 microns at 800 cm$^{-1}$. Attenuated total reflectance infrared spectroscopy penetrates 1 to 2 microns, also varying with the same wavelengths as listed above. These measurements are commonly used in the surface characterization of polymers. The infrared spectrum of the untreated polymer exhibits the following peaks: cis cyclopentene stretch at 3048 cm$^{-1}$, cis norbornene stretch at 3048 cm$^{-1}$, cis/trans double bond linear stretch at 3005 cm$^{-1}$, trans double bond stretch at 1665 cm$^{-1}$, cis double bond stretch at 1653 cm$^{-1}$, cis cyclopentene stretch at 1618 cm$^{-1}$, cis norbornene stretch at 1570-1590 cm$^{-1}$, cis linear double bond in plane deformation at 1412 cm$^{-1}$, trans linear double bond out of plane deformation at 975 cm$^{-1}$, cis cyclopentene in plane deformation at 945 cm$^{-1}$, cis linear double bond out of plane deformation of 753 cm$^{-1}$, cis cyclopentene out of plane deformation at 733 cm$^{-1}$ and 712 cm$^{-1}$ and cis norbornene out of plane deformation at 700 cm$^{-1}$. Most of the interpretation was based on the bands at 3048 cm$^{-1}$ and 975 cm$^{-1}$. Traces of hydroxyl bands were difficult to eliminate even with drying in a desiccator and with desiccant in the instrument. Data on solvent and acid resistance of the polymers are in the discussion with the examples. The times given for the reaction are usually the minimum time for the reaction to go to completion.

EXAMPLE 1

In Example 1 dicyclopentadiene polymers and copolymers were treated with dry chlorine gas at 90° C. for 20 hours. A 0.5×2.5 inch strip cut from a ⅛ inch thick plaque of polymer 1 was placed in a three neck round bottom flask heated in an oil bath. A slow stream of chlorine from a cylinder was passed in through a tube and out an exit bubbler. After 20 hours at 90° C., the strip was removed, washed well with water and dried in an open dish. Analysis of the surface by photoacoustic infrared spectroscopy showed strong new absorption at 1350-650 cm$^{-1}$ with 1272 cm$^{-1}$ assigned to CHCl and 850-680 cm$^{-1}$ assigned to CCl. No band due to a double bond remained at 3048 cm$^{-1}$ indicating the addition of chlorine to the double bond as shown by the disappearance of the 3048 cm$^{-1}$ bond in the infrared spectrum. Treatments for 10 minutes and one hour at room temperature gave little or no change when the spectra were obtained. Liquid chlorine under pressure can be used when it is considered desirable to speed up the reaction.

The chlorine treatment virtually eliminated the emission of residual dicyclopentadiene from a polymer strip as measured by gas chromatography. The measurement of residual DCPD involves the passage of a slow stream of gas over the strip of polymer. The monomer evolved is picked up by an absorbent in said gas. Every few minutes the gas is desorbed for passage into the gas chromatograph for measurement of the residual monomer.

The resistance of the chlorinated polymer was tested with a number of common reagents, as well as with toluene and 70% nitric acid. Toluene and nitric acid were chosen since neither the untreated polymer nor other polyolefins resist them. The chlorinated Polymers 1 and 2 resisted 37% hydrochloric acid, 80% sulfuric acid, 70% nitric acid, 5.25% sodium hypochlorite and acetone for three days at room temperature. The materials swelled 12-15% in ethyl acetate. The protection against 70% nitric acid was considerable (a 0.5-0.7% gain in weight versus a 26% loss in weight for the untreated polymer over a three day span).

EXAMPLE 2

In this Example the polymer was treated with aqueous chlorine. A 4 mm×4 mm square cut from a ⅛ inch plaque of polymer 2 was placed in water. Chlorine gas from a cylinder was passed through for three hours. Chlorine flow was then turned off. The polymer was left in the aqueous medium overnight, for a total of 23 hours. The polymer was removed, then washed well with water and dried in an open dish, then in a dessicator. The infrared spectrum showed a hydroxyl band at 3565 cm$^{-1}$, no remaining double bond at 3048 cm$^{-1}$, CHCl at 1275 cm$^{-1}$, C-OH at 1087 cm$^{-1}$ and CCl at 818-667 cm$^{-1}$. Hypochlorous acid added to the polymer's double bonds. This treatment reduces the rate of emission of residual monomer by 98%. There was no change evident in the size or shape of polymer strips containing EPDM or SBR rubber when treated with aqueous chlorine for 10 days at 90° C. The samples gained about 3% in weight.

EXAMPLE 3

In Example 3, strips of dicyclopentadiene polymer were fluorinated. Fluorine is such a reactive gas that normally it has to be diluted with an inert gas to control the reaction (to prevent charring), as in Set B below. However, with poly(DCPD), the dilution proved to be unnecessary.

The treated strips showed greatly increased resistance to toluene and 70% nitric acid. Fluorination also reduced the rate of loss of residual DCPD monomer by about 99%.

The fluorinated layer produced is thin, about 5 to 10 microns thick. Photoacoustic infrared spectroscopy penetrates 15 to 25 microns into the polymer. If this thickness had been fluorinated completely, all the bands attributable to double bonds and carbon-hydrogen bonds would have disappeared.

Sets of Polymer 1 strips (three strips of ⅛ inch by 3 inches per set) were fluorinated in a one inch diameter nickel tube. Six sets of conditions were used. Unless otherwise stated, all fluorinations were carried out at the summer ambient temperature of between about 31° and 34° C. (A) The control material was not fluorinated. Other samples were subjected to the following treatments: (B) A second set of samples was treated initially with 1% fluorine for 2 hours, increased to 2% fluorine for 2 hours, then 4% fluorine for 2 hours, 8% fluorine for 2 hours, 16% fluorine for 4 hours, and finally 100% fluorine for 9 hours. (C) A third set of samples were treated with 10% fluorine for 4 hours, and then with 100% fluorine for 17 hours. (D) A fourth set of samples was treated with 10% fluorine for 4 hours, then with 100% fluorine for 17 hours, and then the temperature was raised to 50° C. for 4 hours. (E) A fifth set of samples was treated with 10% fluorine for 4 hours, then with 100% fluorine for 4 hours at 50° C. and last with 100% fluorine for 4 hours at 70° C. (F) A sixth and final set of samples was treated with 100% fluorine for 1.5 hours at 60° C.

Photoacoustic infrared spectroscopy of the surface of some samples showed a reduction in the amount of double bonds at 3046, 1408 and 977 cm$^{-1}$ and a reduction of CH bonds at 2932, 2895, 2855 and 1432 cm$^{-1}$. Strong CHF absorption was present at 1313, 1287, 1248, 1213 and 1183 cm$^{-1}$.

A strip of fluorinated polymer D immersed in toluene increased in weight 0.16% in 17 hours and 0.7% in 41 hours. A strip of fluorinated polymer F showed a 0.4% gain in weight in 24 hours. Untreated samples increased 82% by weight in only 18 hours.

A 19 mm portion of a sample was immersed halfway in 70% nitric acid (with the newly cut edge out of the liquid at the top). After three days it had lost 0.3% in weight. A parallel trial showed a weight gain of 1.3% in three days and a gain over the original weight of 0.85% in 7 days. A complete strip of polymer F completely immersed in 70% nitric acid gained 0.4% in weight in 4 days. Untreated polymer lost 24% of its weight when immersed in 70% nitric acid for three days.

EXAMPLE 4

In this example, the DCPD polymer was treated by immersion in liquid bromine. A 0.85×3.75 cm strip of polymer 2 was covered with liquid bromine in a test tube. After one minute, the bromine was poured off. The strip was allowed to dry in an open dish in the hood. The infrared spectrum showed loss of the double bond band at 3048 cm$^{-1}$, some carbonyl band present at 1720 cm$^{-1}$ and strong absorption of CH-Br at 1305, 1251 and 1171 cm$^{-1}$. Energy dispersive x-ray analysis and infrared microspectrometry on 20 micron sections cut by a microtome showed reaction to a depth of 60 microns. The rate of emission of residual dicyclopentadiene was reduced by 89%. Further reduction of the rate of emission will be achieved by longer exposure to the liquid bromine. The polymer brominated for 30 minutes (0.5×2.5 inch strip) exhibited significantly improved resistance to 70% nitric acid with a 1% gain in weight in 71 hours compared to a 26% loss in weight in a control sample. After 4 days in 70% nitric acid a second sample brominated for 30 minutes (0.5×1 inch strip) had gained 0.1% in weight compared to a 15% loss in a control sample.

EXAMPLE 5

In this example hypobromous acid was added to the polymer by treatment with bromine water. A 0.85×3.75 cm strip cut from a ⅛ inch thick plaque of polymer 2 was left in a stirred saturated solution of bromine in water for 24 hours. After removal from the solution, the strip was washed well with water, then dried first in an open dish and then in a dessicator. The infrared spectrum showed hydroxyl at 3528 cm$^{-1}$, only a faint trace of double bond remaining at 3048 cm$^{-1}$, ketone carbonyl at 1724 cm$^{-1}$, CHBr at 1306, 1298, 1248 and 1174 cm$^{-1}$ and C-OH at 1081 cm$^{-1}$. This reduced the rate of emission of residual monomer by 100%. Samples treated with bromine water were resistant to 70% nitric acid with a 3% weight gain after 3 days.

A variety of halogen reagents have been shown to react with the double bonds in polydicyclopentadiene. Disappearance of cis double bonds appears to be faster than trans double bonds. The depth of penetration of the reagent varies with the time for the reaction. Reaction of many or all of the surface double bonds was found with chlorine, bromine, fluorine, aqueous chloride, and aqueous bromine. These substances all drastically reduced the rate of loss of residual monomer with no measurable amounts detectable after treatment with chlorine and aqueous bromine and 89% reduction with bromine, 99% with fluorine and and 98% with aqueous chlorine.

The reacted surfaces also improved the resistance of the polymer to toluene and 70% nitric acid, two reagents chosen because DCPD polymers and other strained ring polyolefins are not resistant to them. Chlorination, bromination and fluorination, as well as treatment with aqueous chlorine and aqueous bromine improved the resistance to 70% nitric acid. Only fluorination gave resistance to toluene.

I claim:

1. A method of treating surfaces of strained ring cycloolefin polymer articles comprising treating the surfaces of said articles with a reagent selected from the group consisting of halogens, pseudohalogen compounds and interhalogen compounds, wherein said strained ring cycloolefin polymer is selected from the group consisting of poly(dicyclopentadiene) and polymers made of polymerization of a mixture of dicyclopentadiene with a strained ring cycloolefin selected from the group consisting of higher cyclopentadiene oligomers, norbornene, norbornadiene, 4-alkylidene norbornenes, dimethanooctahydronaphthalene, and dimethanohexahydronaphthalene.

2. The method of claim 1 wherein said pseudohalogen compounds are selected from the group consisting of ClSCN, ISCN, INCO, (SCH)$_2$, INO$_3$, and BrN$_3$.

3. The method of claim 1 wherein said interhalogen compounds are selected from the group consisting of ICl, IF, and BrF.

4. The method of claim 1 wherein said halogen is selected from the group consisting of bromine, fluorine, and chlorine.

5. The method of claim 4 wherein said halogen is a gas, a liquid or in an aqueous solution.

* * * * *